United States Patent [19]

Staub et al.

[11] 4,031,601

[45] June 28, 1977

[54] METHOD OF FABRICATING AND MOUNTING A FIBERGLASS FAN BLADE

[75] Inventors: Norman T. Staub; Anthony F. Staub, both of Dayton, Ohio

[73] Assignee: Dayton Scale Model Company, Dayton, Ohio

[22] Filed: July 30, 1976

[21] Appl. No.: 710,175

Related U.S. Application Data

[63] Continuation of Ser. No. 549,067, Feb. 11, 1975, abandoned.

[52] U.S. Cl. .................... 29/156.8 B; 29/156.8 P; 29/527.3; 156/155; 156/245; 156/293; 264/258; 264/263; 264/267; 264/274; 264/279; 264/294; 264/328

[51] Int. Cl.² .................... B29D 3/02; B29G 3/00

[58] Field of Search ....... 416/213 A, 213 B, 213 R, 416/219, 220 A, 221, 229, 230; 264/250, 257, 258, 261, 263, 267, 271, 274, 277, 275, 279, 296, 328; 29/156.8 B, 156.8 P, 460, 527.1, 527.3, 527.4, 527.6; 156/155, 293, 245

[56] References Cited

UNITED STATES PATENTS

| | | | |
|---|---|---|---|
| 2,175,204 | 10/1939 | Lougheed | 416/230 |
| 2,182,812 | 12/1939 | Lougheed | 416/230 |
| 2,621,140 | 12/1952 | Bitterli et al. | 416/229 |
| 2,796,215 | 6/1957 | Warnken | 416/230 |
| 2,950,083 | 8/1960 | Compton et al. | 416/219 |
| 3,132,841 | 5/1964 | Wilder | 416/229 |
| 3,713,752 | 1/1973 | Kurti | 416/241 A |
| 3,737,250 | 6/1973 | Pilpel et al. | 416/230 |

*Primary Examiner*—Willard E. Hoag
*Attorney, Agent, or Firm*—Biebel, French & Nauman

[57] ABSTRACT

A method of fabricating and mounting a fiberglass fan blade of predetermined configuration which includes the steps of producing a metal hub having a dovetail slot in one end thereof and also having a bore extending from the other end thereof into said slot, assembling a plurality of layers of resin-impregnated fiberglass sheet in superposed relation forming a blade blank of predetermined dimensions, each of said layers including a blade portion and a root portion of a width at least equal to the diameter of said hub, interleaving additional pieces of the fiberglass sheet with the root portions of said layers to increase the thickness of the resulting root portion of the blank to approximately the configuration of the hub slot, inserting the root portion of the blank into the slot, placing the assembled blank and hub in a mold which includes cavities for the blank and the hub and a shoulder at the inner end of said hub cavity, heating the mold until the resin substantially liquifies while maintaining the one end of the hub in seated relation with the shoulder, forcing additional substantially liquified resin and fiberglass material through the bore into the slot until the slot and all spaces between adjacent the layers are completely filled, closing the heated mold at a predetermined rate into fully closed relation with the blank and the hub, and effecting curing of the resin while maintaining the mold closed.

6 Claims, 6 Drawing Figures

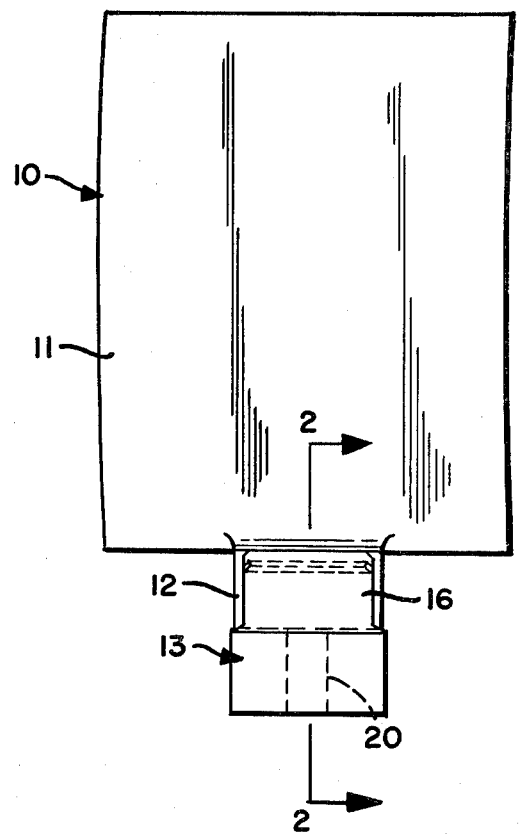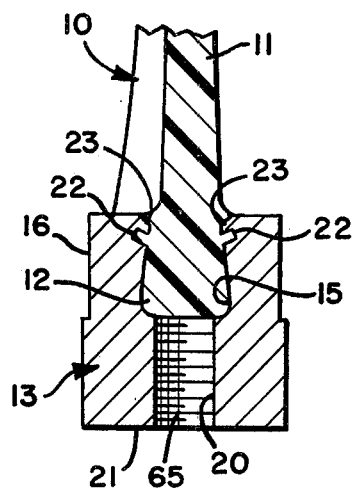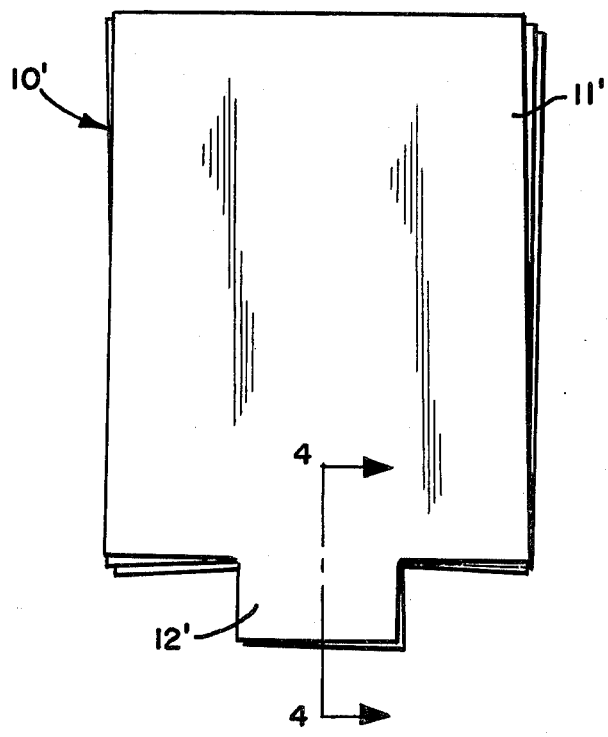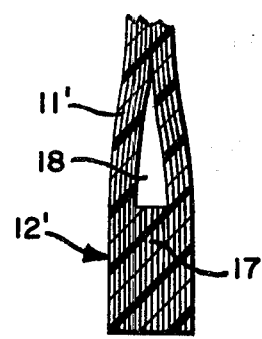

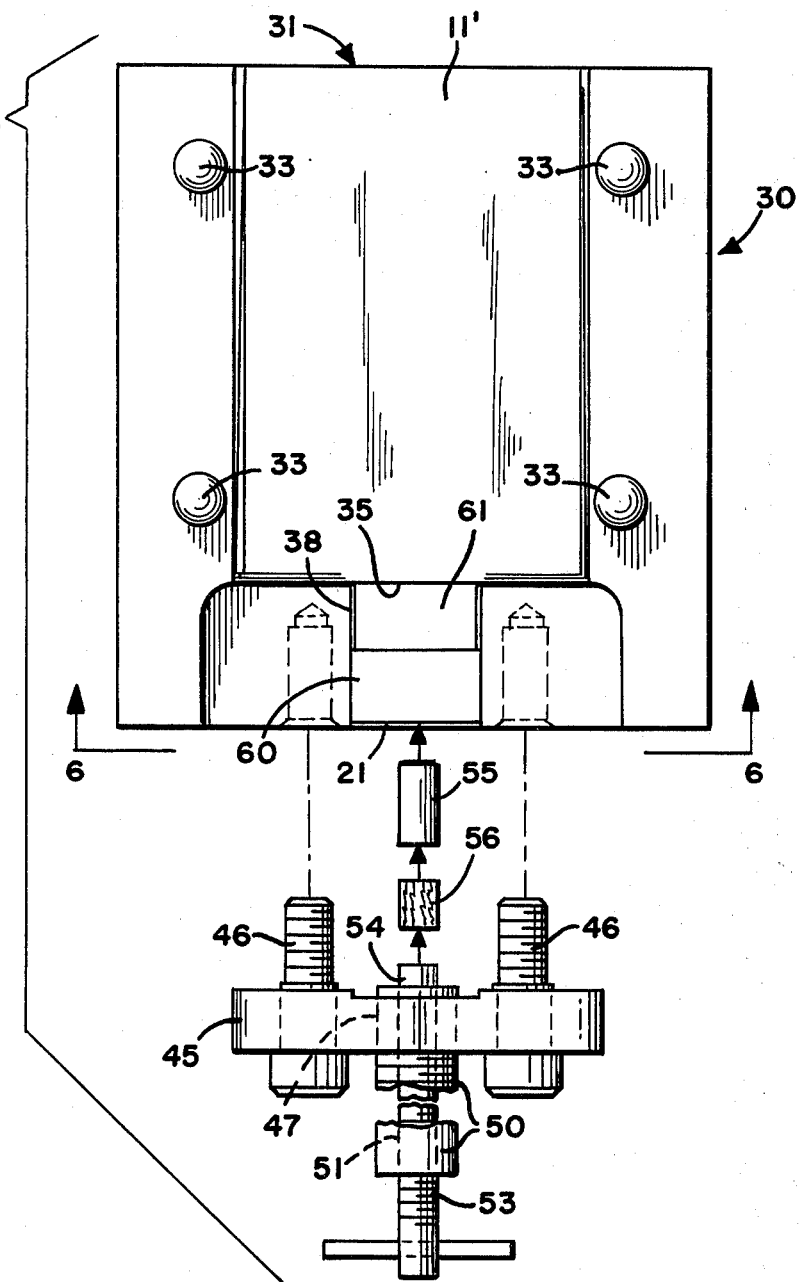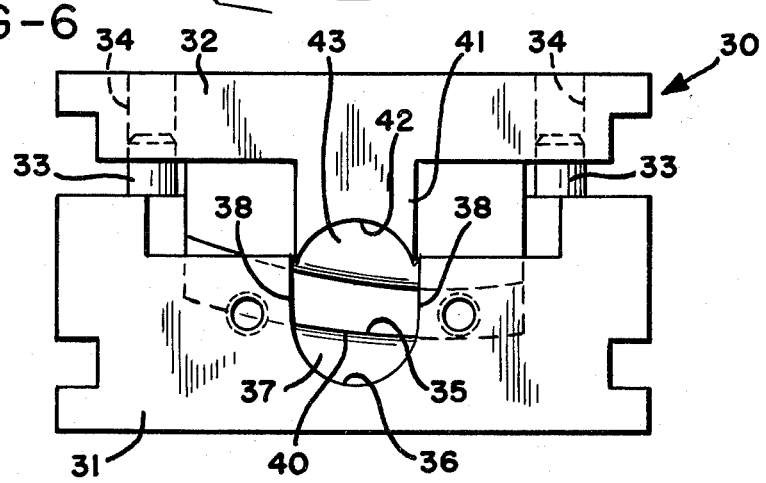

METHOD OF FABRICATING AND MOUNTING A FIBERGLASS FAN BLADE

This is a continuation, of application Ser. No. 549,067, filed Feb. 11, 1975, now abandoned.

BACKGROUND OF THE INVENTION

This invention relates to the manufacture of fan blades of resin impregnated glass fiber material (fiberglass).

Resin-impregnated fiberglass is an excellent material from which to fabricate blades of many types, such particularly as for use in compressors, and especially for research purposes involving the study of the performance characteristics of blades of a variety of configurations. A major problem in the fabrication of such blades, however, involves their mountings, and particularly the means or manner of the connection between the root portion of the blade and the hub by which it is secured in position for use. Considerations of critical importance in the fabrication and mounting of such blades include establishment of the proper symmetrical relation between each blade and its hub, and the strength of the attachment between the blade and the hub.

The present invention is directed to the provision of methods and techniques which have special relation to the solving of these problems in the fabrication and mounting of fiberglass fan blades.

SUMMARY OF THE INVENTION

The invention is independent of the individual configuration of the fan blades to be fabricated and mounted, but it is especially applicable to blades of the type generally utilized in turbines and compressors, which can be generally described as resembling a spade in that each blade comprises a roughly spade-shaped blade portion and a root portion at one end by which it is mounted. The invention provides for the simultaneous molding of the blade and root portions and the securing of the root portion in a metal hub by interaction of the root portion with a dovetail slot in one end of the hub. In a typical example of the invention, the hub comprises a cylindrical metal trunnion having the dovetail slot extending centrally across one end thereof, and there is a generally centrally located bore extending from the other end of the hub into the bottom of this slot.

The blade blank is built up by assembling multiple appropriately configured layers of resin-impregnated fiberglass sheet material, each of which includes a blade portion and a root portion of somewhat greater width than the diameter of the hub. Only enough layers are employed to assure complete filling of the mold in which the blade is formed, but additional small pieces, similar in dimensions to the root portions of the blade sheets, are interleaved with the blade sheet root portions to build up a composite root portion roughly matching the configuration of the slot in the hub. Precise accuracy is not essential in superimposing the several layers in the blade portion of the blank, because minor inaccuracies will be corrected in the shaping of the blank in a mold.

The resulting blade bank is then assembled with the hub by sliding its root portion into the dovetail slot, and the assembled blade blank and hub are positioned in a two-part mold wherein there is one cavity for accurately forming the finished blade, and a second cavity contoured to clamp the hub member therein when the mold is fully closed. There is a shoulder in the female half of the mold which separates the two cavities and faces the hub cavity.

The mold is then partially closed, for example to a clearance of the order of .020 inch between its opposed faces, while accurate seating of the blade and hub in the mold is assured by clamping the hub axially to the lower mold half with its slotted end firmly seating on the shoulder portion of the mold. The mold is heated for a sufficient time to fuse the resin to substantially liquid form, and during this part of the cycle, the mold is closed further at a controlled slow rate until it is completely closed.

Before setting of the resin begins, an additional charge of substantially liquified resin and glass fiber is forced through the bore of the hub into the bottom of the dovetail slot until all spaces within the slot and between layers of the sheet material in the blade blank are completely filled. After the mold is fully closed, curing of the resin is completed by maintaining the mold at the appropriate temperature for the proper time.

It will be apparent that in order to be certain that the mold be completely filled, enough extra material must be provided to cause some to overflow the mold cavity, and it is important that this excess material be prevented from interfering with proper closing of the mold, especially adjacent the hub cavity. This is accomplished in accordance with the invention by providing the portion of the hub wherein the dove tail slot is located with a slightly smaller diameter than the other end portion, thereby establishing clearance in the mold into which excess resin can flow from the slot and blade cavity while the mold fully closes onto the larger diameter portion of the hub. Then after the blade is fully cured, the hub can be machined to the proper final outer diameter while at the same time cleaning excess resin from its peripheral surface.

The major objects of the invention are concerned with the development and provision of methods and techniques for manufacturing fiberglass fan blades more economically and with greater precision than has previously been possible, and the invention is particularly directed to the provision of such methods and techniques whereby each blade is permanently secured in proper relation to its supporting hub simultaneously with its formation.

BRIEF DESCRIPTION OF THE DRAWINGS

FIG. 1 is a view in elevation of a completed fiberglass fan blade and hub assembly in accordance with the invention;

FIG. 2 is an enlarged fragmentary section in the line 2—2 of FIG. 1;

FIG. 3 is a view in elevation of a blade blank in accordance with the invention prior to assembly with a hub;

FIG. 4 is an enlarged fragmentary section on the line 4—4 of FIG. 3;

FIG. 5 is a plan view, partially exploded, of the blade blank and trunnion assembly in the lower half of a mold in accordance with the invention; and FIG. 6 is an end view of the mold assembly taken as indicated by the line 6—6 in FIG. 5.

DESCRIPTION OF THE PREFERRED EMBODIMENTS

The blade assembly shown in FIG. 1 comprises a fiberglass blade structure 10 composed of a blade portion 11 and a root portion 12 by which it is mounted in a metal hub 13, shown as a cylindrical trunnion, the root portion 12 of the blade being secured in the dovetail slot 15 in one end 16 of trunnion 13. The blade structure 10 comprises plural layers of fiberglass material such as fiberglass cloth impregnated with a thermosetting molding resin which may be conventional in the art, such as for example as a polyester molding resin. One example of resin impregnated fiberglass sheets is Scotchply Reinforced Plastic Type XP250 (Crossplied 0.020), manufactured by Minnesota Mining and Manufacturing Co., St. Paul, Minn.

The blade structure 10 is formed from a blank 10' (FIG. 3) composed of multiple layers of resin-impregnated sheet material, the number and the shape of each of these layers being determined in accordance with the desired configuration of the finished blade. In general, each layer will be of a spade shaped configuration composed of a blade portion 11' and a root portion 12', and the width of this root portion will be slightly greater than the diameter of the hub or trunnion 13 e.g. 1/16 to ⅛ inch.

It will be apparent that since the root portion 12 of the finished blade structure is substantially thicker than the blade portion 11, additional material is needed in the root portion 12' of the blank 10'. This additional material is provided by interleaving multiple pieces 17 of sheet material in the root portion 12' with the root portions of the individual layers, sufficient additional pieces being used to build up the root portion 12' to approximately the cross sectional configuration of the slot 15. As also shown in FIG. 4, this procedure will tend to leave gaps within the blank, such particularly as indicated at 18 between adjacent layers.

The trunnion 13 is a generally cylindrical, unitary metal body, of aluminum or the like, having an axial bore 20 extending from the lower end 21 thereof into the bottom of slot 15, preferred results being obtained with a bore 20 of a diameter of ⅜ inch in a trunnion of a diameter and length in the range of 1.0 to 1.5 inches. Near the uppermost edge of each wall of slot 15 is a groove 22 extending the full length of the slot wall in perpendicular relation to the axis of trunnion 13. The edges 23 of slot 15 may be chamfered, as shown, so as to avoid sharp edges which could cut the fiber.

The blade blank 10' is initially mounted in trunnion 13 by sliding its root portion 12' into slot 15. The thus assembled blade blank and trunnion are then placed in a mold 30 (FIGS. 5 and 6) where the blade is to be shaped and to be bonded to the trunnion by the application of heat and pressure. The mold 30 comprises two parts: a lower part 31 and an upper part 32. Guide posts 33 are mounted in lower part 31 and operate in guide holes 34 in the upper mold part, to insure proper fitting between the mold parts 31 and 32 as the mold is closed.

The lower mold part 31 includes blade cavity 35 and trunnion cavity 36. Since the trunnion cavity 36 is necessarily deeper than blade cavity 35, it terminates at its inner end in a shoulder 37, and its sides 38 are straight and parallel with each other. When the trunnion 13 and blade blank 10' are placed in the mold, the top end 16 of the trunnion will seat against the shoulder 37 while the blade portion 11' will rest in cavity 35.

The upper mold part 32 includes a male portion 40 which is the complement of the cavity 35 and is contoured to form the concave side of the blade 11. The mold part 32 also includes a clamp portion 41 which is cylindrically curved at 42 along its lower end to match the curvature of the trunnion 13, the length of this clamp portion 41 being such that it will firmly clamp the trunnion 13 in the cavity 36 when the mold is fully closed, and the inner end of the curved surface 41 also ends at a shoulder 43 coplanar with the shoulder 37. The width of the clamp portion 41 is sufficiently less than the distance between the straight sides 38 of the cavity 36 to provide clearance therebetween of the order of .010 inch.

A hanger 45, which is mounted on the front end of mold part 31 by a pair of bolts 46, is provided with a tapped center bore 47 in which is threaded clamp bolt or ram 50, which also has a tapped center bore 51. After the blade blank and trunnion have been placed in the lower mold half 31 and the mold is partially closed, the ram 50 is screwed forward to engage the lower end 21 of the trunnion and clamp its upper end 16 against the shoulders 37 and 43 and thereby to assure properly maintained alignment between the trunnion and the blade as the resin sets.

The tapered center bore 51 of the ram 50 receives the threaded portion of a plunger 53 which has a smooth end portion 54 sized for free entry into the bore 20 in trunnion 13. This plunger is used during the molding process as a part of the step which assures that the blade root 12 will completely fill the slot 15 and be bonded thereto. For this purpose, a plug 55 of resin and fiberglass material, such as a roll of the same sheet material used in each layer of the blade blank, is placed in the bore 20 while the parts are being assembled. Then when the assembly is placed in the mold, the plunger 53 is backed off sufficiently within the ram bore 51 to provide space in the open end of the bore to receive a short plug 56 sized for sliding fit in the bore 20 and somewhat shorter than the bore 20, e.g. ⅜ inch if the bore is ¾ inch in length. The plug 56 may be formed of wood or any readily machinable material, such as aluminum.

At the start of the molding cycle, the mold parts 31 and 32 are partially closed, for example until there is a clearance of the order of 0.020 inch between their opposed faces. With heat of the proper order applied to the mold, the resin in the blade blank will fuse rapidly, and as soon as it is substantially liquified, the plunger 53 is advanced sufficiently to drive the plug 56 into the trunnion bore 20 and to its inner end. Since the resin in the plug 55 will then also be liquified, the insertion of plug 56 will force the resin and fiberglass material in bore 20 to flow into the dovetail slot 15 until all of the spaces in this slot, and particularly between adjacent layers of sheet material in the blank 10', are completely filled with resin, and the grooves 22 in the walls of slot 15 will also be filled during this stage of the process.

This operation of the plunger 53 is preferably effected just before or promptly after the mold has completed its last .020 inch of closing movement, and the final closing of the mold should be effected at a controlled slow rate such as 0.002 inch per minute. Excess resin will be forced out of the blank during this final closing movement, and during operation of plunger 53, and several provisions are made for assuring escape of this excess material without interfering with proper closing of the mold. Thus at the upper end of the blade, the cavity 35 remains open and is preferably also of such length that there will be excess blade portion in the finished blank which will require trimming. Excess material forced from within the dovetail slot 15 and from the adjacent portion of the blade can flow into the spaces between the walls 38 of cavity 36 and the sides of the clamp portion 41.

In order to assure adequate provision for escape of excess resin without interference with proper clamping of the trunnion 13 in the mold, the trunnion is preferably initially formed of two diameters. The portion 60 which extends from the bottom of the slot 15 to the end 21 is of the same diameter as the cavity 36 and the curved surface 42 of the clamped portion 41. The other part 61 of the trunnion, which contains the slot 15, is initially of a slightly smaller diameter, e.g. 0.010 inch, so that there will be space between this surface and both the cavity 35 and the clamping surface 42.

With this arrangement of relative dimensions, the lower end of the trunnion will be clamped in metal to metal contact with the cavity 36 and clamping surface 42, thereby assuring the proper positioning of the finished blade portion 11 and the trunnion 13 without interference by excess resin, since the latter can flow into the space surrounding the smaller diameter portion of the trunnion and from there to the spaces between the cavity walls 38 and the sides of the clamp portion 41. Excess resin can also flow into the spaces provided by limiting the clamping surface 42 to substantially less than 180°, as shown in FIG. 6, and these spaces extend to the outer end of the mold.

In a typical example of the method of the invention as described above, the period for fusing the resin, during which closing of the mold is completed, will require approximately 10 minutes, after which the mold is held at the curing temperature for the resin for an additional 10 minutes. With the blade blank and trunnion held in the mold in firm predetermined relation with each other during the entire cycle while the blade is both shaped and cured, the proper relationship of the blade and trunnion will be assured, and completion of the assembly requires merely trimming of flash and other excess material from the cured blade portion.

Finishing operations on the trunnion, in addition to whatever turning may be required, will commonly include drilling out the bore 20 to a larger diameter and thereby simultaneously removing the plug 56, which is the main reason for using a plug 56 of wood or other readily machinable material. Thereafter, the bore is preferably tapped, as indicated at 65, to receive a mounting bolt. Preferably, any necessary turning operation on the trunnion will be carried out with the aid of a center point located on the upper end of the blade and in the excess portion which is sufficiently trimmed therefrom so that it will not show on the finished blade.

It will be understood that the method of the invention is essentially independent of the precise shape of the blade and hub, and is therefore applicable to a wide variety of such shapes. It is essential to the practice of the invention only that the mold cavities be properly formed to mirror the desired final blade shape and to receive and hold the hub in properly fixed relation with the blade cavity. Variations in the times and temperatures employed in carrying out the method of the invention may be made as dictated by fiberglass molding technology.

While the method herein described constitute preferred embodiments of the invention, it is to be understood that the invention is not limited to this precise method, and that changes may be made without departing from the scope of the invention.

What is claimed is:

1. A method of fabricating and mounting a fiberglass fan blade in a hub, comprising:
    a. producing a metal hub having a dovetail slot in one end thereof and also having a bore extending from the other end thereof into said slot,
    b. assembling a plurality of layers of fiberglass sheet material impregnated with heat liquifiable and heat curable resin in superposed relation forming an assembly of predetermined dimensions, each of said layers including a blade portion and a root portion of a width at least equal to the diameter of said hub,
    c. interleaving additional pieces of said fiberglass sheet with said root portions of said layers to increase the thickness of the root portion of said assembly to approximately the configuration of said hub slot,
    d. inserting said root portion of said assembly into said slot,
    e. placing said assembly and hub in a mold which includes cavities for said blank and said hub and a shoulder at the inner end of said hub cavity,
    f. heating said mold until said resin substantially liquifies while maintaining said one end of said hub in seated relation with said shoulder,
    g. forcing additional substantially liquified resin and fiberglass material through said bore into said slot until said slot and all spaces between adjacent said layers are completely filled,
    h. closing said heated mold at a predetermined rate into fully closed relation with said assembly and said hub, and
    i. effecting curing of said resin while maintaining said mold closed.

2. The method as defined in claim 1 wherein the walls of said slot are provided with at least one groove extending transversely of the axis of said bore, and wherein said forcing step causes each such groove to be filled with resin and fiberglass material.

3. The method as defined in claim 1 wherein said hub cavity is of uniformly cyclindrical configuration, a portion of said hub adjacent said other end thereof is of cylindrical configuration matching said mold cavity, and the portion of said hub containing said slot is cylindrical and of smaller diameter than said mold cavity to provide a clearance therebetween for receiving resin from said slot during said forcing and closing steps.

4. The method as defined in claim 1 comprising the step of inserting additional fiberglass material impregnated with additional siad resin in said hub bore prior to said heating step, and forcing the said additional resin from said bore into said slot.

5. The method as defined in claim 4 wherein said forcing step is effected by insertion of a plug in said bore, and further comprising the step of enlarging said bore by drilling and simultaneously removing said plug therefrom.

6. A method of simultaneously fabricating and mounting a fiberglass fan blade of predetermined configuration in a hub which comprises the steps of:
    a. producing a unitary metal hub having a dovetail slot extending radially across one end thereof in axially spaced relation with the other end thereof and also having a bore extending axially from said other end thereof into said slot, b. forming an assembly of predetermined dimensions by assembling a plurality of layers of glass sheet material, impregnated with heat liquifiable and heat curable resin in superposed relation, each of said layers including a blade portion and a root portion of a width approximately equal to the diameter of said hub, c. interleaving additional pieces of said fiberglass sheet with said root portions of said layers to increase the thickness of the resulting root portion of said assembly to approximately the cross sectional configuration of said hub slot with said layers converging from said thickened root portion into said blade portion and thereby defining an open space within said assembly adjacent said root portion, d. inserting said root portion of said asembly into said slot with spaces between said root portion and the side walls of said slot, e. placing said assembly and hub in a mold which includes cavities for said assembly and said hub and a shoulder at the inner end of said hub cavity, f. heating said mold until said resin substantially liquefies while maintaining said one end of said hub in seated relation with said shoulder, g. applying pressure on said substantially liquefied resin and fiberglass material in said slot by forcing plug means in said bore until all open spaces between adjacent said layers and between said root portion and said slot side walls are completely filled, h. closing said heated mold at a predetermined rate into fully closed relation with said assembly and said hub, i. effecting curing of said resin while maintaining said mold closed, and j. removing said plug means from said bore after said resin is substantially cured.

* * * * *